United States Patent [19]

Dreibelbis et al.

[11] 4,454,891
[45] Jun. 19, 1984

[54] AIR GAP DRAIN MODULE FOR USE IN A REVERSE OSMOSIS SYSTEM

[75] Inventors: Richard C. Dreibelbis, FairLawn; Richard J. Smith, Wayne, both of N.J.

[73] Assignee: Emerson Electric Co. (H & H Precision Products Division), Cedar Grove, N.J.

[21] Appl. No.: 356,389

[22] Filed: Mar. 9, 1982

[51] Int. Cl.³ .............................................. F16K 24/00
[52] U.S. Cl. .................................... 137/216; 137/801; 210/418; 210/433.2
[58] Field of Search .................. 210/257.2, 418, 433.2; 137/216, 801; 285/DIG. 22, 321

[56] References Cited

U.S. PATENT DOCUMENTS

| | | | |
|---|---|---|---|
| 3,155,106 | 11/1964 | Baron | 137/216 |
| 3,183,923 | 5/1965 | Hendrikson | 137/216 |
| 3,425,438 | 2/1969 | Suffron | 137/216 |
| 3,455,324 | 7/1969 | Bieri et al. | 137/216 |
| 3,512,545 | 5/1970 | Weaver | 137/216 |
| 3,620,241 | 11/1971 | Brown | 137/216 |
| 3,929,149 | 12/1975 | Phillips | 137/216 |
| 3,967,638 | 7/1976 | Tondreau | 137/216 |
| 4,111,464 | 9/1978 | Asano et al. | 285/321 X |
| 4,134,419 | 1/1979 | Richetti | 137/216 |
| 4,210,533 | 7/1980 | Astl | 210/433.2 X |

Primary Examiner—Gerald A. Michalsky
Attorney, Agent, or Firm—Daniel H. Bobis

[57] ABSTRACT

An air gap drain module for use with the dispensing head of a reverse osmosis dispensing system for potable water has an inner waste water tube and an outer drain tube which are disposed concentric to each other at one end and for a portion of the length of the inner tube adjacent the concentric end. An air gap in the form of spaced slots is provided adjacent the concentric end of the drain tube and a closure is connected to the common end of the waste water tube and drain tube with an annular flange or skirt thereon in assembled position disposed to extend between the waste water tube and the drain tube to form an annular passage about the waste water tube and direct the movement of process water issuing from the concentric end of the waste water tube into the drain tube. The closure forms a chamber or trap with the adjacent end of the waste water tube which in conjunction with the spaced slots prevent back flow into the waste water tube. The dispensing head is modified to provide a bore therein to permit the air gap drain module to be removably assembled therein.

9 Claims, 10 Drawing Figures

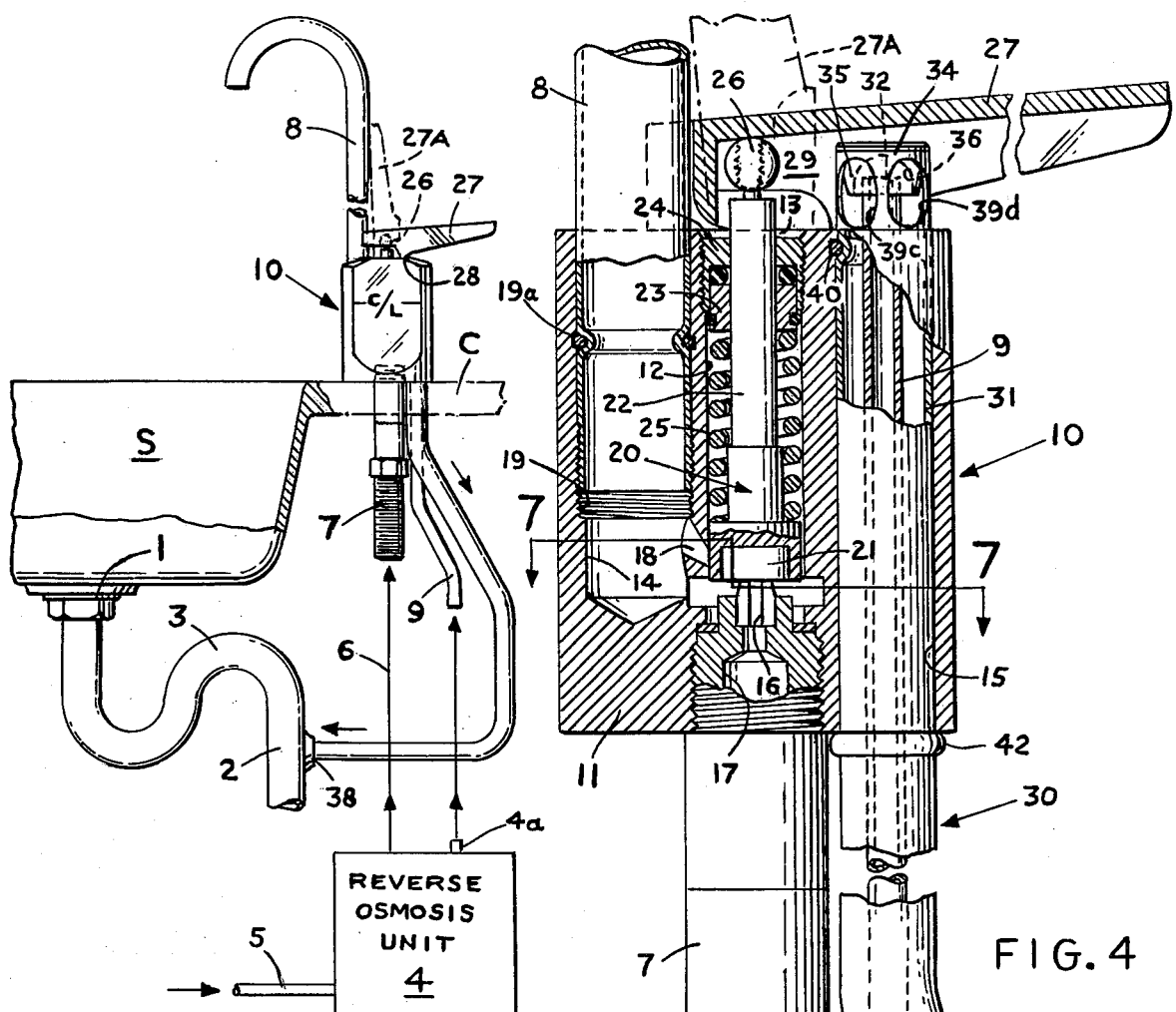
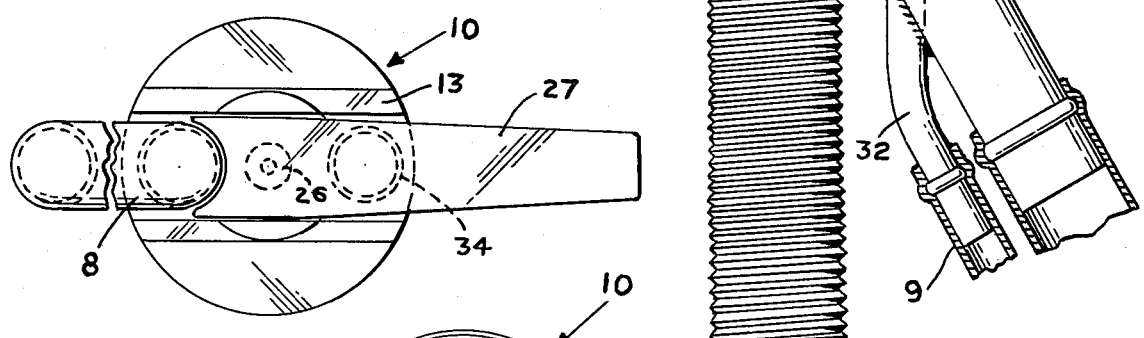
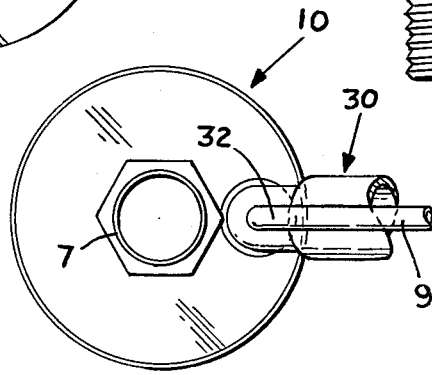
FIG. 1
FIG. 2
FIG. 3
FIG. 4

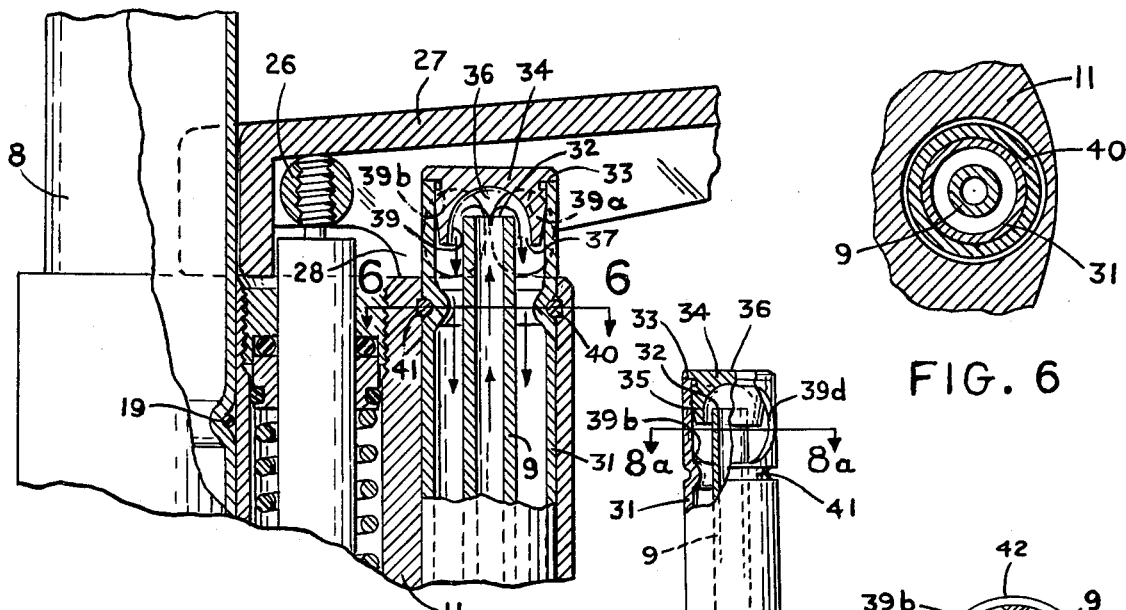
FIG. 5
FIG. 6
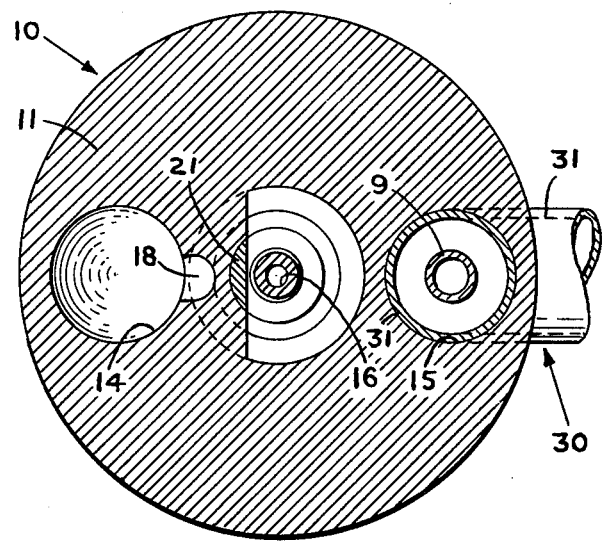
FIG. 7
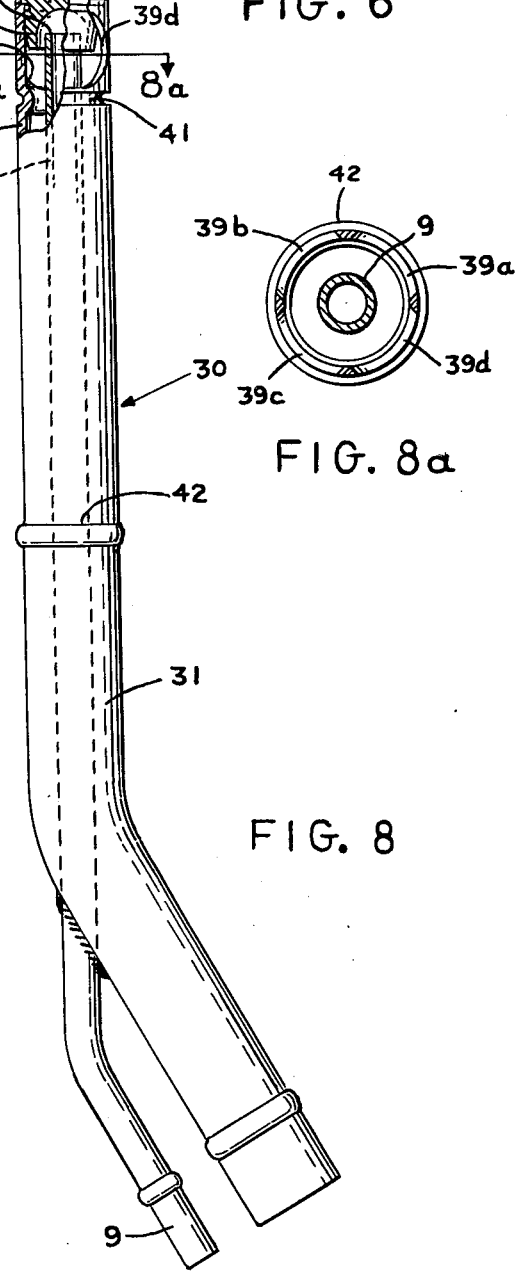
FIG. 8a
FIG. 8
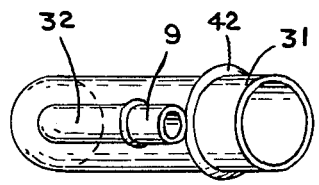
FIG. 9

AIR GAP DRAIN MODULE FOR USE IN A REVERSE OSMOSIS SYSTEM

BACKGROUND OF THE INVENTION

This invention relates generally to dispensing systems for potable water and more particularly to an improved, air gap drain module for use in a reverse osmosis system or preferably in a reverse osmosis dispensing system for potable water.

Reverse osmosis systems referred to alternatively herein as R/O Systems, applied to the purification of water are known in the art. Their use is expanding rapidly for the production of relatively small quantities of potable water for household uses.

Such reverse osmosis systems under normal operating conditions produce a continuous flow of waste water which has a high salt content and this waste water or brine must have a continuous drainage facility for removing this process water from the reverse osmosis system. In this respect for the safety of the system and to meet laws and ordinances of towns and municipalities particularly where such drainage facilities are connected to the sewer system, an adequate anti-syphon means is required to prevent the possibility of sewage or tainted water backing into the R/O System through the drain for the waste water or brine. Generally this is in the form of a 1" or more air gap in the drain line at a point or at a specified height above the valve mounting surface or waste water basin overflow plane.

The use of a separate and independent air gap or anti-syphon devices for R/O Systems for potable water are shown in U.S. Pat. Nos. 3,183,923 and 3,455,324 and illustrate one means of meeting and overcoming this problem.

However in order to avoid the expense of and the additional installation requirements of a separate air gap fixture, combination dispensing heads with integral air gap units to meet the requirements of the law and ordinances and to make these drainage facilities acceptable and safe for the users of an R/O System have been developed and used as is shown in U.S. Pat. Nos. 3,620,241 and 3,967,638.

The present invention provides an improved air gap drain module which permits the standard dispensing head to be so modified that it can be used either as a conventional dispensing head or carafe filler or alternatively and selectively as a combined dispensing head and air gap drain module which is particularly adaptable for use with the R/O Systems for providing purified water.

The standard dispensing head formed in accordance with the present invention is provided with an auxiliary bore into which the air gap drain module in accordance with the present invention can be removably connected. Further, by reason of this construction, the air gap drain module can be furnished with the associated connecting lines, normally plastic tubing, which is preassembled so that the air gap drain module can be easily installed in the field by snapping the same into assembled position in the modified standard dispensing head and connecting the drains to the drainage facility at the installation site.

SUMMARY OF THE INVENTION

Thus, the present invention covers an improved air gap drain module for use in a reverse osmosis system which includes, a waste water tube connected at one end to the source of waste water in said reverse osmosis system, a drain tube connected to the opposite end of the waste water tube so that the drain tube and the waste water tube are disposed concentric to each other for a portion of their length, sized air gap means formed in the wall of said drain tube, a closure means connected to the end of said drain tube having means thereon coacting with the associated end of the waste water tube to turn waste water into said drain tube and to prevent back flow of water from the drain tube into the waste water tube, and said drain tube connected to a drainage facility at the end remote from the end concentric with said waste water tube.

Additionally a dispensing head for a reverse osmosis system having an auxiliary air gap drain module bore therein, and the combination with said air gap drainage module bore of an air gap drain module as above described, and means for removably connecting said air gap drain module in said air gap drain module bore.

Additionally a reverse osmosis dispensing system for providing potable water having a reverse osmosis unit, and the combination with said reverse osmosis unit of the combined dispensing head and air gap drain module as above described.

Accordingly it is an object of the present invention to provide an improved air gap drain module for use in reverse osmosis systems.

It is another object of the present invention to provide an improved dispensing head in which an air gap drain module can be removably mounted.

It is another object of the present invention to provide an improved dispensing head which can be used as a conventional dispensing head or can be combined with a removably mounted air gap drain module for use in connection with reverse osmosis dispensing systems for providing potable water.

It is another object of the present invention to provide an air gap drain module which can be preassembled and snapped into position in the improved dispensing head to enable the use thereof with a reverse osmosis dispensing system for providing potable water.

These and other features, objects and advantages of the invention will be better understood by reference to the following detailed description taken in connection with the FIGURES shown in the drawings which depicts one preferred embodiment of the present invention.

BRIEF DESCRIPTION OF THE DRAWINGS

FIG. 1 is a schematic view of a potable water dispensing system showing a dispensing head and air gap drain module in accordance with the present invention operatively associated with a reverse osmosis unit for providing potable water.

FIG. 2 is a top view of the dispensing head and air gap drain module shown in FIG. 1.

FIG. 3 is a bottom view of the dispensing head and air gap drain module shown in FIG. 1.

FIG. 4 is a side view partly in vertical section of the dispensing head and air gap drain module shown in FIG. 1 with only a fragment of the dispensing tube or spout in assembled position therein.

FIG. 5 is an enlarged fragmentary view of the upper section of the dispensing head and air gap drain module shown in FIG. 4.

FIG. 6 is a cross-section taken on line 6—6 of FIG. 5.

FIG. 7 is a cross-section taken on line 7—7 of FIG. 4.

FIG. 8 is an enlarged side elevation partly in vertical section at the air gap end of the air gap drain module in accordance with the present invention.

FIG. 8a is a schematic cross-sectional view at the air gap end of the air gap drain module of FIG. 8, taken along line 8a—8a thereof.

FIG. 9 is a bottom view of the air gap drain module as shown in FIG. 8.

DESCRIPTION OF THE PREFERRED EMBODIMENT

Referring to the drawings FIG. 1 shows schematically a reverse osmosis dispensing system for providing purified or potable water which includes a dispensing head generally designated 10 in which as shown at FIG. 4 is mounted an air gap drain module generally designated 30 in accordance with the present invention.

The dispensing head 10 is mounted on a counter generally designated C by any suitable means at a point adjacent a sink generally designated S having a drain 1 connected to a drain pipe 2 having the conventional U-tube fitting 3 therein for draining water or other waste materials from the sink S to a sewer or the like type system not shown.

The dispensing head 10 is operatively associated with a reverse osmosis unit 4 which has an inlet line 5 connected to any suitable source of water to be purified in the reverse osmosis unit 4.

Reverse osmosis units are well known in the art, easily purchaseable on the open market and accordingly will not be more fully described herein.

In such reverse osmosis units the greater portion of the water entering through line 5 will be discharged through discharge line 6 which will be connected to the connecting section 7 for the dispensing head 10 which controls the flow of such purified or potable water from the reverse osmosis unit 4 to a discharge spout 8 for dispensing the potable water as may be required by the user.

Additionally however in the operation of the reverse osmosis unit 4 a continuous small portion of the source water becomes waste or process water having a high salt content and this process water or brine is passed to one end of the waste water line 9 of the air gap drain module 30 which will also be more fully described hereinafter.

Referring now to FIGS. 1, 2, 3, 4, 5, and 7 of the drawings, the dispensing head 10 is shown as having a generally cylindrical main body 11 with a centrally disposed control valve bore 12 extending from the upper face 13 in general alignment with the longitudinal axis of the main body 11. Spaced on approximately opposite sides of the central bore 12 are a discharge spout bore 14 and an air gap drain module bore 15.

The control valve bore 12 has an inlet port 16 which communicates with an inlet passage 17 extending through the inlet or connecting section 7 to which the discharge line 6 of the reverse osmosis unit 4 is connected so that purified or potable water can flow from the reverse osmosis unit 4 through the discharge line 6 and inlet passage 17 to the inlet port 16 all of which is clearly shown in FIGS. 1, 4 and 5 of the drawings. The connecting section 7 will provide means for connecting the dispensing head 10 to the counter C.

Between the control valve bore 12 and the discharge spout bore 14 is an outlet connecting passage 18 so that purified or potable water entering the control valve bore 12 will automatically pass through the outlet connecting passage 18 into the discharge spout bore 14. The discharge spout 8 threadably connected into the discharge spout bore 14 as by threaded means 19 will direct or pass water entering the discharge spout bore from the dispensing system to the desired use or into the sink S. An O-ring seal 19a forms a water tight seal to prevent leakage of water from the dispensing spout bore.

To control the flow of potable water from the reverse osmosis unit 4 a control valve assembly generally designated 20 is mounted in the control valve bore 12.

Control valve assembly 20 includes a valve head 21 disposed at one end of the valve stem 22 which extends upwardly in the longitudinal line of the control valve bore to a point exterior of the upper end 13 of the cylindrical main body 11 through a packing and sealing member 23 which is held in assembled position by threaded means 24. The valve head 21 is normally seated on the inlet port 16 and maintains the inlet valve port 16 closed by means of a control valve spring 25 which is disposed about the valve stem 22 between the valve head 21 and the packing and sealing assembly 23 as is clearly shown in FIG. 4 of the drawings.

The end of the valve stem 22 remote from the head 21 which extends to the exterior of the cylindrical main body 11 through the upper end 13 thereof is operatively connected as at 26 to a manually actuated handle member 27 which is pivotally operable as at 28 with respect to the upper surface 13 of the cylindrical main body 11.

FIGS. 1, 2 and 4 show that the handle member 27 is elongated and has a hollow space 29 therein so that in assembled position on the cylindrical main body 11 it will extend outwardly over the air gap drain module 30 so as to substantially conceal the same in assembled position but at the same time make the same accessible when the handle is moved from its pivoted position on the cylindrical member 11 to a hold-open position as shown by the dotted lines at 27a.

When the outlet end of the handle member is depressed it pivots so that the portion connected at 26 to the valve stem 22 will cause the valve stem 22 to lift the valve head 21 off of the inlet port 16.

Since the pressure from the water source is greater than atmospheric pressure, potable water flows from the reverse osmosis unit 4 through discharge line 6 into the inlet passage 17 in the connecting section 7 and through the inlet port 16 into the control valve bore 12. This potable water passes from the control valve 12 through the outlet connecting passage 18 into the dispensing spout bore 14 and through the dispensing spout 8 to its point of use.

As long as the handle 27 is maintained in the depressed position or when flipped to the hold-open position as at 27a potable water will continue to flow through the dispensing spout 8 for the system. When the actuating handle 27 is released the spring 25 will expand to cause the valve head 21 to again move to the normally closed position and to stop the flow of potable water through the inlet port 16.

This operation of the dispensing head as above described is well known and those skilled in the art will readily understand that the present application is not directed to the ability of the improved dispensing head for dispensing potable water. The purpose of the above description is to show how the dispensing head is associated with the reverse osmosis unit and provides the means for mounting the air gap drain module as will now be more fully described.

AIR GAP DRAIN MODULE

As has been indicated above the reverse osmosis unit 4 has a by-product waste water or brine which must be drained to any suitable waste point so as to provide for the safe operation of the system and further to comply with the laws and ordinances which are applicable to these systems so as to prevent the potable water from becoming polluted because of the back flow of tainted water through the reverse osmosis unit.

The present invention accomplishes this by providing the air gap drain module 30 which is connected to remove waste water or brine from the reverse osmosis unit and pass the same to the drain line 2 of the associated sink S in a manner which will prevent the problems of back flow or tainting of the potable water being dispensed by the system.

Thus, referring to FIGS. 1 to 8 of the drawings, the air gap drain module 30 is shown to include the waste water line 9 which is connected to the outlet for waste water as at 4a of the reverse osmosis unit. The waste water tube 9 is operatively connected by any suitable means to a drain tube 31 at the end remote from the reverse osmosis unit and the waste water tube 9 and drain tube 31 are disposed concentric to each other for a portion of their length adjacent a common end thereof so that the waste water tube lies within the drain tube in substantially the longitudinal centerline thereof as is clearly shown in FIGS. 4, 5 and 8 of the drawings.

FIGS. 4, 5 and 8 further show that in assembled position the end 32 of the inner waste tube 9 lies inwardly of the end of the associated outer drain tube 31 and that a cap member 34 can be removably connected to the end 33 of the outer drain member 31. An annular inwardly extending flange 35 on the cap member 34 has a length sufficient to permit the flange 35 to extend between the outer wall of the inner waste water tube 9 and the inner wall of the drain tube 31 so that it extends beyond the end 32 of the inner waste water tube 9 to form adjacent the end 32 the hollow semi-spherical space 36 and about the inner waste water tube 9 a passage 37. The smooth rounded semi-spherical space 36 and passage 37 function and coact to turn waste water flowing from the end 32 of the inner waste water tube 9 through the passage 37 into the drain tube 31 which is connected as at 38 to the drain line 2 for the sink S so that the drain tube 31 can drain the same to waste.

In the sides of the drain tube 31 adjacent the end 33 spaced air gap means as at 39a, 39b, 39c and 39d are formed so that the lie outboard of the annular flange or skirt 35 which extends downwardly from the cap member 34, to a point above the lower edge of the apertures or air gap means 39a, 39b, 39c and 39d as is clearly shown in FIGS. 8 and 8a of the drawing.

The apertures of air gaps 39a, 39b, etc. are sized in accordance with the laws or ordinances and as is clearly shown in FIGS. 4 and 5 of the drawings will lie more than 1" above the point where the control valve 10 is mounted to the counter surface C, safely above the overflow plane of the sink S. The mark C/L on the side of the control valve 10, as shown in FIG. 1, is established by a back-syphonage test which are used to determine that the module functions within the defined statutory limits regarding the size and position of the air gaps.

In order to permit the air gap drain module to be mounted into the air gap drain bore 15 a suitable snap assembly 40 is provided inwardly of the upper surface 13 which will engage a grooved section 41 on the air gap drain module when the air gap drain module is pushed into the air gap drain module bore 15. A shoulder as at 42 is provided to fix the position of the upper end of the air gap drain module so that it will fit under the actuating handle 27 and not interfere with the operation thereof when it is in assembled position.

In operation when the waste water or brine leaves the reverse osmosis unit through waste water tube 9, the stream of waste water passing through the end 32 of the waste water line 9 either runs down the outer surfaces of tube 9 or impinges on the inner wall of the cap or closure member 34 where the direction of the flow of waste water is reversed so that it is moved in a direction to drain through the annular passage 37 into the drain tube 31.

The surface tension effect of the water developed by the annular skirt or flange 35 on the cap 34 allows water to flow through this system at a significantly higher rate without ejecting any of this water out of the apertures 39a, 39b, etc. which provide the air gap at the top of the drain tube 31 because the water tends to cling to the outside of the waste water tube 9 as it flows through the annular passage 37 in the reverse direction caused by impingement on the inner wall of the cap. The water drains through the drain tube 31 to the point of connection with the drain 2 where it is passed to the sewer not shown.

The cap or closure member 34 coacts with the slots or air gaps 39a and 39b in that it provides an air pocket or chamber 36 in the space above the end 32 of the inner waste tube 9. If back flowing water or drain water attempts to reach a level higher than the bottom of the annular flange or skirt 35, the pressure developed in the air pocket or chamber 36 prevents the back flowing tainted water from the drain tube 31 from entering the end 32 of the inner waste tube 9 and forces the back flowing water to overflow through the air gap slots 39a and 39b thus preventing pollution of the potable water being dispensed through dispensing head 10 as above described. This overflow will also signal visually defective operation of the system which can then be shut down and the elements and their operation checked to correct such defect.

Those skilled in the art will recognize that interconnecting flexible tubing used between the air gap drain module 30 and the respective reverse osmosis unit 4 and drain line 2 may be readily preassembled on lines 9 and 31 of the air gap drain module prior to installation of the air gap drain module into the air gap module bore 15 in the dispensing head 10 and that this greatly facilitates the installing of the air gap module to a premounted dispensing head in accordance with the present invention.

Since the air gap module 30 is free to rotate in the air gap module bore 15, the interconnecting flexible tubing can be freely oriented to the optimum position of assembling relative the points of connection to the reverse osmosis system 4 and the drain line 2.

Thus, in accordance with the present invention the dispensing head can function either as a conventional dispensing head or as a combined dispensing head and air gap module assembly when it is desirable or necessary to utilize a reverse osmosis system for providing potable water.

By preassembling the air gap drain module it is possible to convert the improved dispensing head as herein described to coact with a reverse osmosis system by snapping the concentric end of the air gap drain module 30 as above described into assembled position.

The length of the flange skirt 35, the smooth rounded semispherical inner wall of the space 36 formed when the cap 34 is disposed in assembled position relative the end 32 of the waste tube 9, and the annular passage 37 all coact to not only provide the desired function as above described but additionally provide the control valve with the air gap module assembly therein with the capability to perform the back-syphonage test required to meet the provisions of the statutes and ordinances applicable to R/O Systems to which these control valve modules are particularly applicable.

It will be understood that the invention is not to be limited to the specific construction or arrangement of parts shown but that they may be widely modified within the invention defined by the claims.

What is claimed is:

1. An air gap drain module for a reverse osmosis potable water system comprising:
   a. main body having a control valve bore and a dispensing spout bore, and an auxiliary bore extending end to end therethrough;
   b. A waste water tube connected at one end to said reverse osmosis system and having an opposite upper end,
   c. a drain tube having an end connected concentric in surrounding relation to at least a portion of the opposite upper end of said waste water tube, and said drain tube including an opposite end remote from the concentric end thereof and communicating with waste disposal means,
   d. an end closure connected to the concentric end of said drain tube,
   e. means on said end closure for directing waste water issuing from said waste water tube to drain through said drain tube to the waste disposal means, said means on said end closure including a first portion positioned above and centrally with respect to the opposite upper end of said waste water tube for changing the direction of flow of waste water issuing from said waste water tube and directing said waste water issuing from said waste water tube to drain through said drain tube to said waste disposal means, and
   f. means for inhibiting flow of waste water from said drain tube to said waste water tube by providing an air chamber between said opposite upper end of said waste water tube and said first portion, said means for inhibiting including sized slot means in the concentric end of said drain tube which forms an air gap for said air gap drain module.

2. An air gap drain module as claimed in claim 1 wherein the means on the end closure further includes a circumferential annular flange extending longitudinally between the waste water tube and the drain tube and being concentric with the opposite upper end of the waste water tube so as to prevent back flow of waste water from said drain tube into said waste water tube.

3. An air gap module as claimed in claim 1 wherein the means on said closure means further includes:
   a. an annular flange having an inner wall and an outer wall and a predetermined length,
   b. said annular flange extending between the outer wall of the waste water tube and the inner wall of the drain tube and from said first portion to a position at least above the lowermost edge of the sized slot means in the drain tube,
   c. said annular flange and the opposite upper end of the waste water tube forming annular passage means communicating at one end thereof with said air chamber and at an opposite end thereof with said drain tube so that waste water issuing from the upper end of the waste water tube will be directed through said annular passage means into said drain tube.

4. An air gap drain module according to claim 1 further comprising means for removably mounting said air gap drain module in said auxiliary bore in a snap-fitting arrangement and at a predetermined position.

5. An air gap drain module as claimed in claim 1 wherein said first portion includes a part-spherical section positioned above and centrally with respect to said opposite upper end of said waste water tube for changing the direction of flow of waste water issuing from said waste water tube and directing said waste water issuing from said waste water tube to drain through said drain tube to said waste disposal means.

6. A dispensing head for a reverse osmosis system for dispensing potable water comprising:
   a. main body means having a control valve bore and a dispensing spout bore, and an auxiliary bore extending end to end therethrough,
   b. an air gap drain module,
   c. means for removably connecting the air gap drain module in the auxiliary bore,
   d. a waste water tube connected at one end to said reverse osmosis system and having an opposite upper end,
   e. a drain tube having an end connected concentric in surrounding relation to at least a portion of the opposite upper end of said waste water tube, and said drain tube including an opposite end remote from the concentric end thereof and communicating with waste disposal means,
   f. sized slot means in the concentric end of said drain tube which forms an air gap for said air gap drain module,
   g. an end closure connected to the concentric end of said drain tube, and
   h. means on said end closure for directing waste water issuing from said waste water tube to drain through said drain tube to the waste disposal means, said means on said end closure including a first portion positioned above and centrally with respect to the opposite upper end of said waste water tube for changing the direction of flow of waste water issuing from said waste water tube to drain through said drain tube to said waste disposal means.

7. A dispensing head as claimed in claim 6 wherein the means on the end closure further includes a circumferential annular flange extending longitudinally between the waste water tube and the drain tube and being concentric with the opposite upper end of the waste water tube so as to prevent back flow of waste water from said drain tube into said waste water tube.

8. A dispensing head as claimed in claim 6 wherein the means on said end closure further includes:
   a. an annular flange having an inner wall and an outer wall and a predetermined length,
   b. said annular flange extending between the outer wall of the waste water tube and the inner wall of the drain tube and from said first portion to a position at least above the lowermost edge of the sized slot means in the drain tube, c. said annular flange and the opposite upper end of the waste water tube forming annular passage means communicating at one end thereof with said air chamber and at an opposite end thereof with said drain tube so that waste water issuing from the upper end of the waste water tube will be directed through said annular passage means into said drain tube.

9. A dispensing head for a reverse osmosis system for dispensing potable water comprising,
   a. main body means having, a control valve bore and a dispensing spout bore, and an auxiliary bore extending end to end therethrough, and
   b. an air gap drain module including,
      i. means thereon for removably connecting the same in said auxiliary bore in the dispensing head,
      ii. a waste water tube connected at one end to said reverse osmosis system,
      iii. a drain tube connected concentric to the opposite end of said waste water tube and for a portion of the length thereof adjacent to said end, and the end of said drain tube remote from the concentric end communicating with a waste disposal point,
      iv. sized slot means in the concentric end of said drain tube to form an air gap for said air gap drain module,
      v. an end closure connected to the concentric end of said drain tube, and
      vi. means on said closure means operatively associated with the adjacent end of said waste water tube to turn waste water issuing from said waste water tube so that it will drain through said drain tube to the waste water disposal point.

* * * * *